Figure 1:
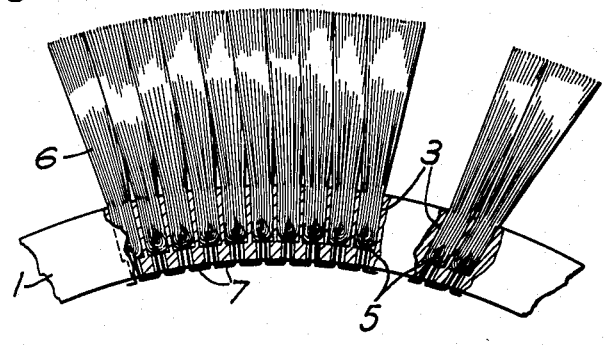

United States Patent [19]
Ferguson et al.

[11] 3,917,150
[45] Nov. 4, 1975

[54] SEALS AND METHOD OF MANUFACTURE THEREOF

[75] Inventors: John Gilbert Ferguson; Geoffrey Dallinger Waters, both of Bristol, England

[73] Assignee: Rolls-Royce (1971) Limited, London, England

[22] Filed: Nov. 15, 1974

[21] Appl. No.: 524,379

[30] Foreign Application Priority Data
Nov. 23, 1973 United Kingdom............... 54518/73

[52] U.S. Cl.................................. 228/159; 227/53
[51] Int. Cl.². .................... B23K 31/02; F16J 15/48
[58] Field of Search.......... 29/470.5, 480, 481, 484; 277/55, 53, 54, 236, 237

[56] References Cited
UNITED STATES PATENTS
3,050,891  8/1962  Thomsen .............................. 29/480
3,807,620  4/1974  Paquette .............................. 228/47

Primary Examiner—Al Lawrence Smith
Assistant Examiner—Margaret M. Joyce
Attorney, Agent, or Firm—Stevens, Davis, Miller & Mosher

[57] ABSTRACT

A method of manufacture of an annular seal element comprises the steps of providing an apertured backing ring with closely packed bristles extending radially outwardly from the circumference thereof, clamping the free ends of the bristle between a pair of co-axial rings and welding the rings and the outermost tips of the bristles into a unitary structure and subsequently machining away the original backing ring to leave the rings with radially inwardly extending bristles.

The invention also includes a sealing element made by the method.

6 Claims, 4 Drawing Figures

U.S. Patent  Nov. 4, 1975  3,917,150

SEALS AND METHOD OF MANUFACTURE THEREOF

This invention relates to seals, and relates in particular to a method of making seal elements and to seal elements made by the method.

In seals between relatively moving parts, there is always a danger of excessive movement of one of the parts towards the other, which can cause severe rubbing contact between the opposite elements of the seal. This is a particular problem in gas turbine engines which have many high speed rotating components carrying seal elements, and rubbing of seals at high speeds can cause excessive heating of the seal elements and even destruction of the seal.

This problem has been tackled in the past, for example, by providing abradable coatings on the static seal element which can be worn away by the rotating seal element. This disadvantage of this solution is that once a rub has occurred, the clearance between the rotating seal element and the worn-away coating is increased and sealing efficiency is lost.

The object of the present invention is to provide a seal which overcomes this disadvantage.

According to the present invention a method of manufacturing a seal element comprises the steps of making a brush having a plurality of tightly packed bristles secured to and projecting from a surface of a backing member, clamping the free ends of the bristles between a pair of clamping members, integrally joining the clamping members and the tips of the bristles, and subsequently removing the backing member and the ends of the bristles attached thereto.

Where the seal element is to form part of a seal between static and rotating structure the original backing member is made as a ring and the bristles may extend either outwardly or inwardly from the ring. The clamping members are also rings and are axially spaced to sandwich the bristles between them.

For gas turbine engine application the bristles will normally be metallic and more specifically for high temperature applications the metal will be a heat resistant metal.

Also according to the invention there is provided a seal including a seal element made according to the method described above.

Figure 2:
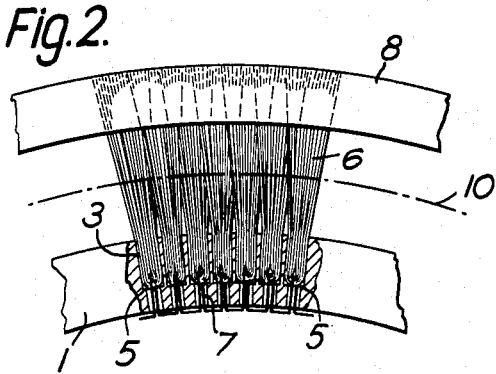
Figure 3:
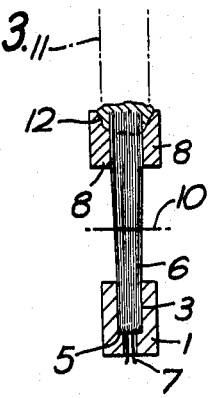
Figure 4:
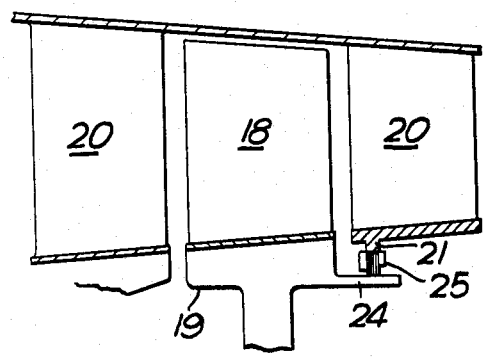

The invention will now be more particularly described, by way of example only, with reference to the accompanying drawings in which:

FIG. 1 is a sectional elevation of a brush which forms the first stage of the manufacture of a seal element of the present invention, FIG. 2 is a sectional elevation of the brush of FIG. 1 with the clamping members attached, FIG. 3 is an end elevation of the brush of FIG. 2, FIG. 4 is a part of a gas turbine engine showing a typical application of a seal element of the present invention.

Referring now to the drawings in FIG. 1 there is shown a backing ring 1 through which are formed a plurality of holes 3 having a step 5 adjacent their radially inner ends. The left hand side of the figure shows radial holes but on the right-hand side an alternative construction is shown in which the holes 3 are shown to lie at an angle to the radial direction.

The holes are formed as close together as they can possibly be made without breaking into one another and into each hole is pulled a bundle of metallic bristles 6. The bristles are usually straight pieces of small diameter wire i.e. less than 0.005 in diameter and as many as possible are disposed in each of the holes.

The bristles are held in place by a wire lacing which consists of a small diameter copper wire which passes up through one hole, over the central portion of the bent-up bundle of bristles, back down the same hole and up into the next hole, so that all the bundles of bristles are wired together and can be pulled down into their respective holes to seat on the step 5.

The number of bristles projecting outwardly from the holes should be as large as possible and in one example 140 wires of 0.003 in diameter were doubled over and pulled into each hole so that 280 bristles were formed. The diameter of the hole in this example was 0.0625 ins. and the width of the brush produced, i.e. the axial spacing between the clamping rings is 0.10 ins.

The brush construction so far described results in groups of substantially parallel bristles emerging from the holes, but each group is spaced from the next by the wall thickness between the holes. This clearly would not be acceptable for a seal element since the spaces provide a leakage path.

However, at their free ends, the fibres, being not quite parallel, having become intermixed and no spacing such as occurs between the groups at the ring is discernable.

A pair of clamping rings 8 are arranged, one on each side of the brush, and the radially outer ends of the bristles are welded to these rings to form an integral bond. The ring 1 and the wire laced ends of the bristles are then machined away, for example along the dotted line 10 to leave free bristle ends of the desired length protruding from the rings 8.

Provided the initial lengths of wire are sufficiently long to form brush bristles up to 0.75 ins long, the bristles will be sufficiently compact and sufficiently intermixed at their radially outer ends to allow for them to be cut off to approximately 0.25 ins. as the final step. The length of bristle allows sufficient flexibility while allowing also for the bristles to be tightly picked together.

The above described method produces a brush with radially inwardly extending bristles but clearly the method can be applied to the production of a brush having radially outwardly extending bristles. In this case the brush formed initially would be produced with radially inwardly projecting bristles, the radially inner free ends would be clamped and welded and then the original ring and bristle mountings would be machined away to leave radially outwardly projecting bristles.

Clearly also, the seal element formed need not be annular but can be flat, and this can be achieved by making the original brush flat.

The method of joining the bristles to the clamping rings is preferably by welding and a suitable method is the use of an electron beam which is directed at the outer circumference of the bristles and rings. This melts the outer tips of the bristles and the rings to form a weld 12 which integrally unites the bristles and rings. Clearly however, other methods of joining can be used to produce a similar integral joint, for example, brazing and diffusion bonding.

In order to simplify the joining of the bristles and the rings 8 they are preferably made from the same material, for example, in gas turbine engine seals stainless steel can be used, or for high temperature seals one of the range of nickel based alloys sold under the trade name NIMONIC, is used.

It is also envisaged that the bristles need not be metallic but the method described above is still applicable to non-metallic bristles.

A typical application of a seal element made according to the invention is shown in FIG. 4 in which there are shown two stator stages 20 of a compressor of a gas turbine engine with a rotor stage therebetween. The rotor stage comprises a disc 19 having a plurality of blades 18 mounted on the periphery thereof. Between a flange 24 on the rotor disc 19 and a flange 21 on one of the stators 20 there is formed a seal which comprises a seal element 25 in the form of a brush constructed in accordance with the method of the present invention. The seal element 25 co-operates with the flange 24 to form the complete seal which reduces leakage of air between the rotating and static structures.

The advantages of the seal element of the present invention are that should the flange 24 grow outwardly excessively due to excessive differential thermal expansion during transient running conditions of the engine, contact will be made between the flange 24 and the bristles, but the flexibility and resilience of the bristles will allow them to deflect during such contact so that little wear is produced. After rubbing contact has ended, i.e. when normal engine running conditions are renewed, the bristles will return substantially to their normal position and the sealing clearance will be maintained at a small value.

Another effect of the bristles, is that they do not heat up as quickly as a solid piece of material, as for example in a conventional labyrinth seal. This is partly because the deflection of the bristles reduces the rubbing pressure and partly because, although the bristles are tightly packed there is a tendency for a very small leakage flow of air to pass between the bristles in an axial direction, which will carry some heat generated by the rubbing away with it. Thus there will be less tendency for the heat generated by the rubbing to cause increased thermal expansion of the flange and aggravate the rubbing conditions.

To aid deflection of the bristles, they may be angled in the direction of rotation of the flange 24 by using the alternative method of manufacture described in relation to FIG. 1.

Further, a plurality of seal elements including the bristles may be used in series depending on the degree of sealing required, and to this end a multiple seal element may be made by clamping a second brush between one of the clamping rings of a seal element as described and a third clamping ring, and welding them to the seal element. Further brush elements can be added in this manner as desired.

The brush seal elements may be used either as the static or rotating components of a seal between relatively rotating parts, but preferably the brush seal elements are the static elements to avoid centrifugal effects on the bristles affecting the sealing characteristics. Clearly also brush sealing elements of this type can be used to seal static parts.

One of the clamping rings 8 may have a greater radial depth than the other (as shown in FIG. 4) to resist sideways flexing of the bristles due to a pressure difference across them.

We claim:

1. A method of manufacturing a seal element comprising the steps of making a brush having a plurality of tightly packed bristles secured to and projecting from a surface of a backing member, clamping the free ends of the bristles between a pair of clamping members, integrally joining the clamping members and the tips of the bristles, and subsequently removing the backing member and the ends of the bristles attached thereto.

2. A method according to claim 1 and in which the bristles and clamping rings are metallic and are integrally joined by welding, brazing of diffusion bonding.

3. A method according to claim 1 and wherein the bristles are made to project at an angle to the surface of the backing member, whereby in the finished seal element, the bristles project at an angle from the clamping members.

4. A method according to claim 1 and wherein the backing member is annular and the bristles project radially from the radially inner circumferential surface thereof, and the clamping members are co-axial rings which clamp the free radially inner ends of the bristles whereby the resulting seal element is annular and has radially outwardly extending bristles.

5. A method according to claim 1 and wherein the backing member is annular and the bristles project radially from the radially outer circumferential surface thereof, and the clamping members are co-axial rings which clamp the free radially outer ends of the bristles whereby the resulting seal element is annular and has radially inwardly extending bristle.

6. A seal element manufactured by the method according to claim 1.

* * * * *